US012270353B2

(12) United States Patent
Dölker

(10) Patent No.: US 12,270,353 B2
(45) Date of Patent: Apr. 8, 2025

(54) CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

(71) Applicant: Rolls-Royce Solutions GmbH, Friedrichshafen (DE)

(72) Inventor: Armin Dölker, Friedrichshafen (DE)

(73) Assignee: Rolls-Royce Solutions GmbH, Friedrichshafen (DE)

(*) Notice: Subject to any disclaimer, the term of this patent is extended or adjusted under 35 U.S.C. 154(b) by 0 days.

(21) Appl. No.: 18/536,374

(22) Filed: Dec. 12, 2023

(65) Prior Publication Data

US 2024/0110531 A1 Apr. 4, 2024

Related U.S. Application Data

(63) Continuation of application No. PCT/EP2022/066833, filed on Jun. 21, 2022.

(30) Foreign Application Priority Data

Jun. 22, 2021 (DE) ..................... 10 2021 206 421.3
Jun. 21, 2022 (WO) ................. PCT/EP2022/066833

(51) Int. Cl.

*F02D 41/14* (2006.01)
*F02D 41/00* (2006.01)
*F02D 41/28* (2006.01)

(52) U.S. Cl.

CPC ..... *F02D 41/1402* (2013.01); *F02D 41/0097* (2013.01); *F02D 41/28* (2013.01); *F02D 2250/18* (2013.01)

(58) Field of Classification Search

CPC .. F02D 41/1402; F02D 41/0097; F02D 41/28; F02D 2250/18; F02D 31/001; F02D 41/1401; F02D 2041/1419; F02D 29/06
See application file for complete search history.

(56) References Cited

U.S. PATENT DOCUMENTS 6,326,702 B1 12/2001 Yonekura et al.
9,388,753 B2 7/2016 Prochaska et al.
(Continued)

FOREIGN PATENT DOCUMENTS

DE 10 2008 036 300 B3 1/2010
DE 10 2017 212 958 A1 1/2019
JP 6133550 B2 4/2017

OTHER PUBLICATIONS

International Search Report and Written Opinion dated Dec. 2, 2022 for International Patent Application No. PCT/EP2022/066833 (17 pages).

(Continued)

*Primary Examiner* — Joseph J Dallo
(74) *Attorney, Agent, or Firm* — TAYLOR & EDELSTEIN

(57) ABSTRACT

A closed-loop control device, for closed-loop control of a power assembly including an internal combustion engine and a generator having an operative drive connection to the internal combustion engine, includes: the closed-loop control device which is configured for: detecting a generator power ($P_G$) of the generator as a controlled variable; determining a control deviation ($e_P$) as a difference between the generator power ($P_G$) which is detected and a target generator power ($P_{soll}$); determining a target speed ($n_{soll}$) as a
(Continued)

manipulated variable for controlling the internal combustion engine as a function of the control deviation ($e_P$); using a control rule for determining the target speed ($n_{soll}$); and being operatively connected to an open-loop control device of the internal combustion engine in such a way that the target speed ($n_{soll}$) can be transmitted by the closed-loop control device to the open-loop control device.

15 Claims, 8 Drawing Sheets

(56) References Cited

U.S. PATENT DOCUMENTS

| | | | | |
|---|---|---|---|---|
| 9,550,413 | B2 | 1/2017 | Take | |
| 9,574,511 | B2 | 2/2017 | Kim et al. | |
| 10,103,666 | B1 * | 10/2018 | Fan | H02P 9/00 |
| 2002/0017269 | A1 * | 2/2002 | zur Loye | F02B 37/18 123/305 |
| 2009/0093921 | A1 | 4/2009 | Falkenstein | |
| 2010/0057330 | A1 * | 3/2010 | Whitney | F02D 41/402 701/103 |
| 2015/0275484 | A1 | 10/2015 | Ishihara et al. | |
| 2016/0336928 | A1 * | 11/2016 | Kuznetsov | H02J 3/30 |
| 2017/0102165 | A1 * | 4/2017 | Brekken | F24H 9/2021 |
| 2017/0170764 | A1 * | 6/2017 | Blackwelder | H02P 6/20 |
| 2020/0091728 | A1 * | 3/2020 | Cassoli | F03D 9/255 |
| 2021/0111651 | A1 | 4/2021 | Manson et al. | |
| 2021/0111652 | A1 | 4/2021 | Schweitzer, III et al. | |

OTHER PUBLICATIONS

“Operation and Control of a Distributed Microgrid with Hybrid System”, Megha Goyal and Rajesh Gupta, In: IEEE 5th India International Conference on Power Electronics (IICPE), 2012, S. 1-6 (6 pages).

“Fundamentals of Turbine/Generator Speed Control: A Graphical Approach for Islanding Applications”, R. E. Cosse, M. D. Alford, M. Hajiaghajani and E. R. Hamilton, In: IEEE Industry Applications Magazine, vol. 19, 2013, Nr. 4, S. 56-62, doi: 10.1109/MIAS.2012.2215640 (8 pages).

“Synchronous Power Controller With Flexible Droop Characteristics for Renewable Power Generation Systems”, W. Zhang, A. M. Cantarellas, J. Rocabert, A. Luna and P. Rodriguez, In: IEEE Transactions on Sustainable Energy, vol. 7, 2016, No. 4, S. 1572-1582. doi: 10.1109/TSTE.2016.2565059 (12 pages).

“A Novel Digital Governor for Diesel Engine Based on Nonlinear PID Strategy”, Zhou, Y., Zhang, Y.F., Jiang, H.K.: In: Applied Mechanics and Materials—Trans Tech Publications, Ltd., 2012, S. 2315-2318. https://doi.org/10.4028/www.scientific.net/amm.229-231.2315 (4 pages).

“Distributed Control Strategies for Microgrids: An Overview”, E. Espina, J. Llanos, C. Burgos-Mellado, R. Cardenas-Dobson, M. Martf nez-G6mez, D. Saez: In: IEEE Access, vol. 8, 2020, S. 193412-193448 (38 pages).

* cited by examiner

CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

CROSS REFERENCE TO RELATED APPLICATIONS

This is a continuation of PCT application no. PCT/EP2022/066833, entitled "CLOSED-LOOP CONTROL DEVICE FOR CLOSED-LOOP CONTROL OF A POWER ASSEMBLY COMPRISING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY", filed Jun. 21, 2022, which is incorporated herein by reference. PCT application no. PCT/EP2022/066833 claims priority to German patent application no. 10 2021 206 421.3, filed Jun. 22, 2021, which is incorporated herein by reference.

BACKGROUND OF THE INVENTION

1. Field of the Invention

The present invention relates to a closed-loop control device, and, more particularly, to a closed-loop control device for closed-loop control of a power assembly.

2. Description of the Related Art

Such a closed-loop control device is typically set up to control the speed of an internal combustion engine and, indirectly, the generator frequency of a generator having an operative drive connection to the internal combustion engine, a power assembly including the internal combustion engine and the generator. This is problematic insofar as a comparatively dynamic variable is used for the closed-loop control. As a result, the closed-loop control is intrinsically comparatively less robust, which has a particularly detrimental effect on steady-state closed-loop control behavior. In addition, the speed controller must be parameterized in a special way in order to be able to provide closed-loop control of the generator frequency. Furthermore, a separate adaptation is required for each speed controller of each specific power assembly. This applies very particularly if the power assembly is operated in combination with other power assemblies in island parallel operation or grid parallel operation, wherein a requested total power is distributed across the various power assemblies. In this case in particular, separate, suitable parameterization of the speed controller is necessary, possibly taking into account an external open-loop control unit used for power distribution.

What is needed in the art is a closed-loop control device for closed-loop control of a power assembly including an internal combustion engine and a generator having an operative drive connection to the internal combustion engine, a closed-loop control arrangement including such a closed-loop control device, a power assembly including an internal combustion engine and a generator having an operative drive connection to the internal combustion engine, including a closed-loop control device of this kind or including a closed-loop control arrangement of this kind, and a method for closed-loop control of a power assembly of this kind, wherein the described disadvantages do not occur.

SUMMARY OF THE INVENTION

The present invention relates to a closed-loop control device for closed-loop control of a power assembly including an internal combustion engine and a generator having an operative drive connection to the internal combustion engine, to a closed-loop control arrangement including such a closed-loop control device, to a power assembly including an internal combustion engine and a generator having an operative drive connection to the internal combustion engine, including a closed-loop control device of this kind or including a closed-loop control arrangement of this kind, and to a method for closed-loop control of a power assembly of this kind.

The present invention provides a closed-loop control device for closed-loop control of a power assembly including an internal combustion engine and a generator having an operative drive connection to the internal combustion engine, wherein the closed-loop control device is designed: to detect a generator power ($P_G$) of the generator as a controlled variable; to determine a control deviation ($e_P$) as the difference between the detected generator power ($P_G$) and a target generator power ($P_{soll}$); and to determine a target speed ($n_{soll}$) as a manipulated variable for controlling the internal combustion engine as a function of the control deviation ($e_P$), wherein the closed-loop control device is also designed to use a control rule for determining the target speed ($n_{soll}$), wherein the closed-loop control device is designed to be operatively connected to an open-loop control device of the internal combustion engine in such a way that the target speed ($n_{soll}$) can be transmitted by the closed-loop control device to the open-loop control device.

The present invention provides a closed-loop control device for closed-loop control of a generator including an internal combustion engine and a power assembly having an operative drive connection to the internal combustion engine, wherein the closed-loop control device is set up to detect a generator power of the generator as a controlled variable, to determine a control deviation as the difference between the detected generator power and a target generator power, and to determine a target speed as a manipulated variable for controlling the internal combustion engine as a function of the control deviation. The closed-loop control device is also designed to use a control rule for determining the target speed. The closed-loop control device is designed to be operatively connected to an open-loop control device of the internal combustion engine in such a way that the target speed can be transmitted by the closed-loop control device to the open-loop control device. In particular, the closed-loop control device is designed as a generator controller and can be operatively connected to the open-loop control device of the internal combustion engine in such a way that the target speed can be transmitted from the closed-loop control device to the open-loop control device. By calculating the target speed as a function of the control deviation determined as the difference between the detected generator power and the target generator power, the closed-loop control device proposed here provides a comparatively slow closed-loop control system that can readjust deviations from the target generator power in a robust manner. Since the closed-loop control device uses a control rule for this purpose, a particularly robust design of the power control is achieved. By contrast, the dynamics for the operation of the power assembly are provided separately by a speed controller implemented in the open-loop control device of the internal combustion engine. This results in a particularly robust design of the closed-loop control device for the purpose of power control. In addition, no independent, separate parameterization of the speed controller of the internal combustion engine is required, which is particularly advantageous with regard to the use of the closed-loop control device in a network of power assemblies, especially if the target generator power assigned to the closed-loop control device is determined in an external open-loop control unit by load distribution of a total power across the individual power assemblies. In particular, no separate adaptation of the closed-loop control device to the external open-loop control unit is required. The fact that the closed-loop control device itself is designed as a generator controller and can be operatively connected to the open-loop control device of the internal combustion engine means that it can be used flexibly with different internal combustion engines in different power assemblies. In particular, the closed-loop control device can also be used with internal combustion engines or power assemblies from other manufacturers.

In the context of the present technical teaching, a control rule is understood in particular to mean a mathematical relationship, especially an equation, which describes the behavior of a controller. In particular, the control rule describes the relationship between the manipulated variable and the control deviation. In particular, the control rule describes how the manipulated variable behaves as a function of the control deviation. In an optional embodiment, the control rule describes the behavior of a controller selected from a group consisting of a P-controller, an I-controller, a D-controller, a PI-controller, a PD-controller, a PD1-controller, a PD2-controller, a PID-controller, a PT1-controller, a PT2-controller, a PI(DT1)-controller, and a combination of at least two of the aforementioned controllers. Control rules that describe the behavior of these and other controllers are generally known to a person skilled in the art.

The control rule is optionally implemented in the closed-loop control device, optionally in a hardware structure of the closed-loop control device, or in the form of software which is executed on the closed-loop control device during operation of the closed-loop control device. In particular, it is possible on the one hand for the manipulated variable to be calculated explicitly as a function of the control deviation by carrying out certain calculation steps in the software; however, it is also possible for the manipulated variable to be determined as a function of the control deviation on the basis of the specific interconnection of the hardware structure of the closed-loop control device, i.e., to be calculated indirectly, so to speak.

A closed-loop control device is understood to mean, in particular, a feedback control device. Correspondingly, a closed-loop control arrangement is understood to mean, in particular, a feedback control arrangement. Accordingly, an open-loop control device is understood to mean, in particular, a non-feedback control device.

In particular, a generator controller is understood to mean an open-loop control unit separate, i.e., in particular external, from the open-loop control device of the internal combustion engine, which unit is set up to control the generator power of the generator by specifying the target speed for the internal combustion engine, in particular to transmit the target speed as a manipulated variable to the open-loop control device of the internal combustion engine. In particular, a generator controller itself is not an open-loop control unit for the internal combustion engine, especially not a so-called engine control unit (ECU). In particular, the generator controller is provided in addition to the open-loop control device for the internal combustion engine, i.e., in addition to the open-loop control unit.

A power assembly is understood here in particular to be an arrangement consisting of an internal combustion engine and an electric machine operable as a generator, i.e., a generator, wherein the internal combustion engine has an operative drive connection to the generator in order to drive the generator. Thus, the power assembly is set up in particular to convert chemical energy converted into mechanical energy in the internal combustion engine into electrical energy in the generator. The power assembly is operated in particular together with a plurality of—in particular a small number of—other power assemblies in a network, i.e., in island parallel operation, or the power assembly is operated on a larger power grid or energy supply grid, in particular a supra-regional power grid, in grid parallel operation.

The generator power detected here as a controlled variable is recorded separately for the respective power assembly, in particular at several power assemblies, optionally at each power assembly of a network of power assemblies, and is used for closed-loop control of the respective power assembly. The generator power detected as a controlled variable is therefore not the total power of the network of power assemblies, but rather the power generated by the individual power assembly in each case. In particular, the generator power is optionally not detected at a busbar to which a plurality of power assemblies are electrically connected.

Optionally, the generator power is detected at the generator of the power assembly.

The target generator power is in particular a load component generated for the respective power assembly, i.e., in particular for the respective closed-loop control device. In particular, this is the component of the total load or total power that is to be provided by the respective power assembly. Optionally, the target generator power is generated as a load component for the respective power assembly by an external open-loop control unit or an external controller. Optionally, a total load is detected—in particular at the busbar—which is then distributed across the individual power assemblies according to an algorithm optionally implemented in the external open-loop control unit. In particular, the closed-loop control device is set up to be connected to the external open-loop control unit in order to receive the target generator power from the external open-loop control unit—as the load component assigned to the closed-loop control device. In particular, the closed-loop control device optionally has an interface suitable for this purpose.

However, an embodiment is also optional in which the closed-loop control device is set up to determine the target generator power itself, i.e., in particular to detect the total power and distribute it across multiple closed-loop control devices—including itself. In this case, the closed-loop control device is optionally designed as a master closed-loop control device. It optionally has an interface via which load requirements calculated for other closed-loop control devices, in particular to slave closed-loop control devices, can be output, for example an interface for a CAN bus.

The fact that the closed-loop control device is set up to be operatively connected to the open-loop control device of the internal combustion engine in such a way that the target speed can be transmitted from the closed-loop control device to the open-loop control device, i.e., can be operatively connected, means in particular that the closed-loop control device has an interface suitable for this purpose. In an optional embodiment, the closed-loop control device is operatively connected—in particular via the interface—to the closed-loop control device of the internal combustion engine in such a way that the target speed can be transmitted from the closed-loop control device to the open-loop control device. Optionally, the closed-loop control device is also set up to receive at least one target torque variable from the open-loop control device. In particular, the interface is optionally set up in such a way that, in addition to the output of the target speed, the at least one target torque variable can be received via the interface. However, it is also possible that a separate, second interface is provided for receiving the at least one target torque variable.

According to a development of the present invention, it is provided that the closed-loop control device is set up to adapt the control rule used to determine the target speed as a function of at least one adaptation variable, wherein the at least one adaptation variable is selected from a group consisting of the detected generator power, a generator frequency, a droop variable and a target torque variable—calculated in particular by the open-loop control device of the internal combustion engine. In particular, the use and very particularly the adaptation of the control rule make it possible to operate the closed-loop control device in combination with a multiplicity of different power assemblies, in particular with a multiplicity of different internal combustion engines, without the need for specific adaptation to the specific power assembly being operated, in particular to the specific internal combustion engine being operated. As a result, the power assembly, in particular the internal combustion engine, can be operated virtually adjustment-free, so that the adaptation effort otherwise required with conventional closed-loop control devices and methods is advantageously minimal, optionally completely eliminated, when using the technical teaching according to the present invention.

In the context of the present technical teaching, a generator frequency is understood in particular to be the frequency of the electrical voltage induced in the generator, in particular the frequency of the electrical output voltage of the generator.

The fact that the control rule is adapted as a function of the at least one adaptation variable also makes it advantageous to keep a loop gain of the open control loop constant at a predetermined value, in particular at a value parameterized by the user, at all operating points, optionally across all operating points. This in turn simplifies the control behavior and thus, at the same time, also the adjustment of the closed-loop control device to the specific application. In particular, the closed-loop control device is easy to adapt in this way and can be used easily and reliably, which also saves costs in the application.

In the context of the present technical teaching, a loop gain of the open control loop is understood in particular as the product of a proportional coefficient of the control rule with the static (s=0) gain of the controlled system in the event of abrupt excitation.

In the context of the present technical teaching, adaptation of the control rule as a function of at least one adaptation variable is understood in particular to mean that at least one parameter determining the control rule is changed as a function of the at least one adaptation variable. In an optional embodiment, the control rule is adapted as a function of the at least one adaptation variable by changing the proportional coefficient of the control rule as a function of the at least one adaptation variable. In an optional embodiment, the control rule is determined in particular by the proportional coefficient as a parameter. Accordingly, an adaptation variable is understood to be a variable as a function of which the at least one parameter determining the control rule is changed. In particular, an adaptation variable is a variable on which a value of the at least one parameter determining the control rule depends.

The droop variable is optionally a variable that is provided and used to ensure a predetermined power distribution across a plurality of power assemblies. The droop variable is also referred to as the P-degree. Optionally, the droop variable is assigned a finite value of a few percentage points, optionally at most 8%, optionally 4%. The droop variable also has a damping and stabilizing effect on the behavior of the power assembly in combination with other power assemblies.

In an optional embodiment, the target torque variable is, in particular, an instantaneous torque of the internal combustion engine. It is possible that the target torque variable is a torque in a stationary state, which is also referred to as stationary torque. Alternatively or additionally, the target torque variable is optionally a—especially filtered—target torque or an integral component for the target torque.

Optionally, the control rule is updated as a function of the at least one adaptation variable, wherein it is adapted—in particular automatically—in particular to changing operating points of the power assembly.

Optionally, the closed-loop control device is set up to limit the detected generator power downward, in particular to a predetermined power limit value.

For the purpose of the following derivation, a stationary state is considered, and therefore the variables concerned are given with the index "stat". However, the relationships, correlations and equations derived in this way are also valid in transient states.

The control rule is optionally determined in particular by:

$$k_p^P = \frac{450\, v^P f_{G,stat}}{P_{G,stat}}\left(1 + d\frac{M_{stat}}{M_V}\right), \tag{1}$$

with the proportional coefficient $k_p^P$, the predetermined, optionally predefinable loop gain $v^P$, the droop variable d, the generator frequency $f_{G,stat}$, the generator power $P_{G,stat}$, the torque $M_{stat}$ and the full-load torque $M_V$. The full-load torque $M_V$ corresponds in particular to the torque at 100% engine power of the internal combustion engine. A relationship such as equation (1) is sometimes also referred to as a control rule for short.

Equation (1) shows that the proportional coefficient $k_p^P$ with a given, constant loop gain $v^P$ varies with the generator frequency $f_{G,stat}$ and the generator power $P_{G,stat}$, and additionally so, if the droop variable d is different from zero in an optional embodiment, with the droop variable d and the torque $M_{stat}$.

If the droop variable d is selected to be zero, the proportional coefficient $k_p^P$ varies with a specified, constant loop gain $v^P$ only with the generator frequency $f_{G,stat}$ and the generator power $P_{G,stat}$:

$$k_p^P = \frac{450 v^P f_{G,stat}}{P_{G,stat}}. \tag{2}$$

The relationship according to equation (2) thus results in particular as a limiting case for d=0 from equation (1). However, it also results in the same form in the case of vanishing load or zero load, i.e., for $M_{stat}=0$, regardless of the value of the droop variable.

At full load with $M_{stat}=M_V$, on the other hand, the following relationship results:

$$k_p^P = \frac{450 v^P f_{G,stat}}{P_{G,stat}}(1+d). \tag{3}$$

Equation (1) can be derived in particular if the linearized representation of the control loop as shown in FIG. 3 is used as a starting point: In it, a target torque $M_{soll}$ is calculated as a function of a speed control deviation $e_n$, a speed proportional coefficient $k_p^n$ and a reset time in $\tau_n^n$, specifically taking into account the complex variable s according to the following equation:

$$M_{soll}(s) = e_n(s) k_p^n \left(1 + \frac{1}{\tau_n^n s}\right). \tag{4}$$

At the same time, the following is read directly from FIG. 3 with the transfer functions shown there:

$$e_n(s) = n_{soll}(s) - \frac{n_N d}{M_V}\frac{k_p^n}{\tau_n^n s} e_n(s) - G_f^n(s) G_s^n(s) M_{soll}(s), \tag{5}$$

with the target speed $n_{soll}$ and the nominal speed $n_N$.

After solving equation (4) according to the speed control deviation $e_n$, reshaping equation (5) and inserting the solved equation (4) into the reshaped equation (5) and reshaping further, the following is obtained:

$$\frac{M_{soll}(s)}{n_{soll}(s)} = \frac{k_p^n M_V (1+\tau_n^n s)}{k_p^n M_V (1+\tau_n^n s) G_f^n(s) G_s^n(s) + n_N k_p^n d + \tau_n^n M_V s}. \tag{6}$$

The transfer function $G_s(s)$ of the controlled system of the power controller starting from the target speed $n_{soll}$ up to the output of an actual power $P_{ist}$ is read as:

$$G_s(s) = \frac{M_{soll}(s)}{n_{soll}(s)} G_s^P(s). \tag{7}$$

Inserting equation (6) into equation (7) gives the following result:

$$G_s(s) = \frac{k_p^n M_V (1+\tau_n^n s)}{k_p^n M_V (1+\tau_n^n s) G_f^n(s) G_s^n(s) + n_N k_p^n d + \tau_n^n M_V s} G_s^P(s). \tag{8}$$

The following applies for the steady-state operating state:

$$s \overset{def}{=} 0, \tag{9}$$

whereby equation (8) assumes the following form in the steady-state operating state:

$$G_s(0) = \frac{k_p^n M_V}{k_p^n M_V g_f^n(0) g_s^n(0) + n_N k_p^n d} G_s^P(0). \tag{10}$$

For the transfer functions of the internal combustion engine $G_s^n(0)$ and of the speed filter $G_f^n(0)$ on the one hand and of the generator $G_s^P(0)$ on the other hand, the following applies in the steady-state operating state:

$$G_s^P(0) = \frac{P_{G,stat}}{15 M_{stat}}, \tag{11}$$

$$G_s^n(0) = \frac{n_{stat}}{M_{stat}}, \tag{12}$$

with the speed $n_{stat}$, and $$G_f^n(0)=1. \tag{13}$$

With $n_N=n_{stat}$, by inserting the equations (11) to (13) into equation (10), expanding with $M_{stat}/M_V$, and some reshaping, the following is ultimately obtained:

$$G_s(0) = \frac{P_{G,stat}}{15 n_{stat}} \left\{ \frac{1}{1 + d\frac{M_{stat}}{M_V}} \right\}. \tag{14}$$

This results with:

$$k_p^P G_s(0) = v^P \tag{15}$$

and furthermore taking into account that, for mains parallel operation in the steady-state state at nominal speed, the following applies:

$$n_{stat} = 30 f_{G,stat}, \tag{16}$$

in the equation (1) determining the control rule.

According to a development of the present invention, it is provided that the closed-loop control device is set up to adapt the control rule by determining the proportional coefficient $k_p^P$ of the control rule in such a way that the predetermined loop gain $v^P$ of the open control loop is constant. In particular, the closed-loop control device is optionally set up to determine the proportional coefficient $k_p^P$ in such a way that the predetermined loop gain $v^P$—in particular over all operating points of the power assembly—remains constant. In particular, the closed-loop control device is advantageously easy to adapt in this way and can be used easily and reliably. In particular, equation (1) shows that it is possible to always adjust the proportional coefficient $k_p^P$ in such a way that the loop gain $v^P$ is constant—in particular irrespective of the current operating point of the power assembly.

The predetermined loop gain $v^P$ is optionally parameterizable, i.e., in particular can be set or preset by a user. In this way, a user of the closed-loop control device or a user of a power assembly that is operated with the closed-loop control device can set the loop gain $v^P$ in the desired manner. The proportional coefficient $k_p^P$ is then suitably adapted to the loop gain $v^P$ selected by the user. This has the advantage that no complex adjustment of the closed-loop control device to the power assembly is required.

In particular, the closed-loop control device is set up to select the proportional coefficient $k_p^P$ so as to be proportional to the predetermined loop gain $v^P$. The predetermined loop gain $v^P$ is optionally set, however, once or at most rarely by a user and otherwise kept constant. It can therefore be regarded as a constant, at least during operation of the power assembly.

According to a development of the present invention, it is provided that the closed-loop control device is set up to calculate the proportional coefficient $k_p^P$ as a function of the generator power, the generator frequency, the droop variable d and the at least one target torque variable. In this way, the proportional coefficient can be updated particularly flexibly and precisely. In particular, the closed-loop control device is optionally set up to determine the proportional coefficient $k_p^P$ according to equation (1).

In particular, the closed-loop control device is optionally set up to calculate the proportional coefficient $k_p^P$ inversely proportionally to the generator power.

Alternatively or additionally, the closed-loop control device is optionally set up to calculate the proportional coefficient $k_p^P$ proportionally to the generator frequency.

Alternatively or additionally, the closed-loop control device is optionally set up to calculate the proportional coefficient $k_p^P$ proportionally to the droop variable d.

Alternatively or additionally, the closed-loop control device is optionally set up to calculate the proportional coefficient $k_p^P$ proportionally to the target torque variable.

According to a development of the present invention, it is provided that the closed-loop control device is set up to calculate the proportional coefficient $k_p^P$ as a function of the generator power, the droop variable d and the at least one target torque variable. In this way, the proportional coefficient $k_p^P$ can also be updated flexibly and accurately, albeit with reduced computational effort. Optionally, the closed-loop control device is set up to keep the generator frequency constant in this case. Since the generator frequency varies only slightly during operation of the power assembly, this results in at most a small, in particular negligible, error. Optionally, a predetermined, constant standard frequency value is selected for the generator frequency, in particular optionally—depending on the application—50 Hz or 60 Hz.

For a standard frequency value of 50 Hz, the following modified relationship results directly from equation (1):

$$k_p^P = \frac{22500\ v^P}{P_{G,stat}}\left(1 + d\frac{M_{stat}}{M_V}\right). \tag{17}$$

The following modified relationship results accordingly for a standard frequency value of 60 Hz:

$$k_p^P = \frac{27000\ v^P}{P_{G,stat}}\left(1 + d\frac{M_{stat}}{M_V}\right). \tag{18}$$

Alternatively or additionally, it is optional that the closed-loop control device is set up to calculate the proportional coefficient $k_p^P$ as a function of—in particular only—the generator power and the generator frequency. This also represents a stable option for updating the proportional coefficient $k_p^P$ with reduced computational effort at the same time, especially since the droop variable d has only a minor influence on the proportional coefficient $k_p^P$. In particular, the closed-loop control device is optionally set up to determine the proportional coefficient $k_p^P$ according to equation (2). Due to the small influence of the droop variable on the proportional coefficient $k_p^P$, equation (2) represents a very good approximation.

Alternatively or additionally, it is optional that the closed-loop control device is set up to calculate the proportional coefficient $k_p^P$ as a function of the generator power only. Since the detected generator power is available in the closed-loop control device itself, it does not have to be provided by an external controller. This embodiment therefore represents a particularly robust way of calculating the proportional coefficient $k_p^P$. In an optional embodiment, the relationship according to equation (2) can also be further simplified by using a constant generator frequency, in particular by setting the generator frequency to a predetermined standard frequency value.

For a standard frequency value of 50 Hz, the following modified relationship then results directly from equation (2):

$$k_p^P = \frac{22500\ v^P}{P_{G,stat}}. \tag{19}$$

The following modified relationship results accordingly for a standard frequency value of 60 Hz:

$$k_p^P = \frac{27000\ v^P}{P_{G,stat}}. \tag{20}$$

Alternatively or additionally, it is optional that the closed-loop control device is set up to calculate the proportional coefficient $k_p^P$ as a function of—in particular only—the droop variable and the at least one target torque variable. In particular, the closed-loop control device is optionally set up to calculate the proportional coefficient $k_p^P$ according to the following relationship:

$$k_p^P = \frac{45 \cdot 10^4 v^P}{\pi M_{stat}}\left(1 + d\frac{M_{stat}}{M_V}\right). \tag{21}$$

The relationship according to equation (21) can be derived here as follows:

The following applies for the generator power in unitless representation:

$$P_{G,stat} = \frac{\pi}{3 \cdot 10^4} M_{stat} n_{stat}, \tag{22}$$

which, with equation (16), gives:

$$P_{G,stat} = \frac{\pi M_{stat} f_{G,stat}}{10^3}. \tag{23}$$

Inserting equation (23) into equation (1) immediately gives equation (21).

According to a development of the present invention, it is provided that the closed-loop control device is set up to filter an instantaneous actual power of the generator and to use the filtered actual power as the detected generator power. This advantageously enables particularly quiet and therefore robust control. The instantaneous actual power is optionally measured—in particular electrically—directly at the generator. According to an optional embodiment, the instantaneous actual power is filtered using a $PT_1$ filter or a mean value filter, wherein the detected generator power results from the $PT_1$ filter or the mean value filter.

The present invention also provides a closed-loop control arrangement for closed loop control of a power assembly including an internal combustion engine and a generator having an operative drive connection to the internal combustion engine, which closed-loop control arrangement includes a closed-loop control device according to the present invention or a closed-loop control device according to one or more of the previously described exemplary embodiments and an open-loop control device operatively connected to the closed-loop control device for direct control of the internal combustion engine. The closed-loop control device is set up to transmit the target speed to the open-loop control device. In particular, the advantages which have already been explained in conjunction with the closed-loop control device are provided in conjunction with the closed-loop control arrangement.

The open-loop control device is optionally an engine controller of the internal combustion engine. The open-loop control device is particularly optionally a so-called engine control unit (ECU). The engine controller or the ECU is optionally set up to calculate at least one energization duration for at least one fuel injection valve, in particular an injector, of the internal combustion engine on the basis of the target speed—optionally via the intermediate step of a target torque. The open-loop control device optionally has a speed controller, or a speed controller is implemented in the open-loop control device. The speed controller is optionally designed as disclosed in patent specification DE 10 2008 036 300 B3.

According to a development of the present invention, it is provided that the open-loop control device is set up to determine, in particular to calculate, at least one target torque variable and to transmit it to the closed-loop control device, wherein the closed-loop control device is set up to receive the at least one target torque variable from the open-loop control device. The at least one target torque variable is in particular the target torque variable which is optionally used in the closed-loop control device to adapt, in particular to update, the control rule, in particular in accordance with equation (1).

According to a development of the present invention, it is provided that the open-loop control device is set up to determine, as the at least one target torque variable, a variable which is selected from a group consisting of a—optionally filtered—target torque and an integral component for the target torque of a speed controller of the open-loop control device.

In an optional embodiment, the at least one target torque variable is the target torque which is used in the open-loop control device to calculate an energization duration for the fuel injection valves, in particular as a manipulated variable of the speed controller. Alternatively or additionally, the at least one target torque variable is optionally an integral component (I component) of the target torque.

The present invention also provides a power assembly which has an internal combustion engine and a generator having an operative drive connection to the internal combustion engine. In addition, the power assembly has a closed-loop control device according to the preset invention or a closed-loop control device according to one or more of the previously described exemplary embodiments. Alternatively, the power assembly has a closed-loop control arrangement according to the present invention or a closed-loop control arrangement according to one or more of the previously described exemplary embodiments. The closed-loop control device or the closed-loop control arrangement is operatively connected to the internal combustion engine and the generator of the power assembly. In particular, the advantages which have already been explained above in conjunction with the closed-loop control device or the closed-loop control arrangement are provided in conjunction with the power assembly.

Lastly, the present invention also provides a method for closed-loop control of a power assembly including an internal combustion engine and a generator having an operative drive connection to the internal combustion engine, wherein a generator power of the generator is detected as a controlled variable. A control deviation is determined as the difference between the detected generator power and a target generator power. A target speed is determined as a manipulated variable for controlling the internal combustion engine as a function of the control deviation. In addition, the target speed is determined, in particular calculated, on the basis of a control rule. In particular, the advantages which have already been explained above in conjunction with the closed-loop control device, the closed-loop control arrangement or the internal combustion engine are provided in conjunction with the method. As part of the method, a power assembly according to the present invention or a power assembly according to one or more of the previously described exemplary embodiments is optionally operated.

The target speed is optionally calculated in a closed-loop control device designed as a generator controller and is transmitted—in particular via an interface—to an open-loop control device designed as an engine controller.

Optionally, a closed-loop control device according to the present invention or a closed-loop control device according to one or more of the previously described exemplary embodiments is used in the method for closed-loop control of the power assembly. Alternatively or additionally, a closed-loop control arrangement according to the present invention or a control arrangement according to one or more of the previously described exemplary embodiments is optionally used within the scope of the method for closed-loop control of the power assembly.

Optionally, the control rule used to determine the target speed is adjusted, in particular updated, as a function of at least one adaptation variable. The at least one adaptation variable is selected here from a group consisting of the detected generator power, a generator frequency, a droop variable and a target torque variable—calculated in particular by the open-loop control device of the internal combustion engine.

Optionally, the control rule is adapted by determining a proportional coefficient of the control rule in such a way that a predetermined loop gain of the open control loop is constant, optionally remains constant.

Optionally, the proportional coefficient is calculated as a function of the generator power, the generator frequency, the droop variable and the at least one target torque variable.

According to an alternative embodiment, the proportional coefficient is optionally calculated as a function of the generator power, the droop variable and the at least one target torque variable, wherein the generator frequency is optionally set to be constant.

According to an alternative embodiment, the proportional coefficient is optionally calculated as a function of—in particular only—the generator power and the generator frequency.

According to an alternative embodiment, the proportional coefficient is optionally calculated as a function of the generator power only, wherein the generator frequency is optionally set to be constant.

According to an alternative embodiment, the proportional coefficient is optionally calculated as a function of—in particular only—the droop variable and the at least one target torque variable.

Optionally, an instantaneous actual power of the generator is filtered and the filtered actual power is used as the detected generator power.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplification are not to be construed as limiting the scope of the invention in any manner.

DETAILED DESCRIPTION OF THE INVENTION

Figure 1:
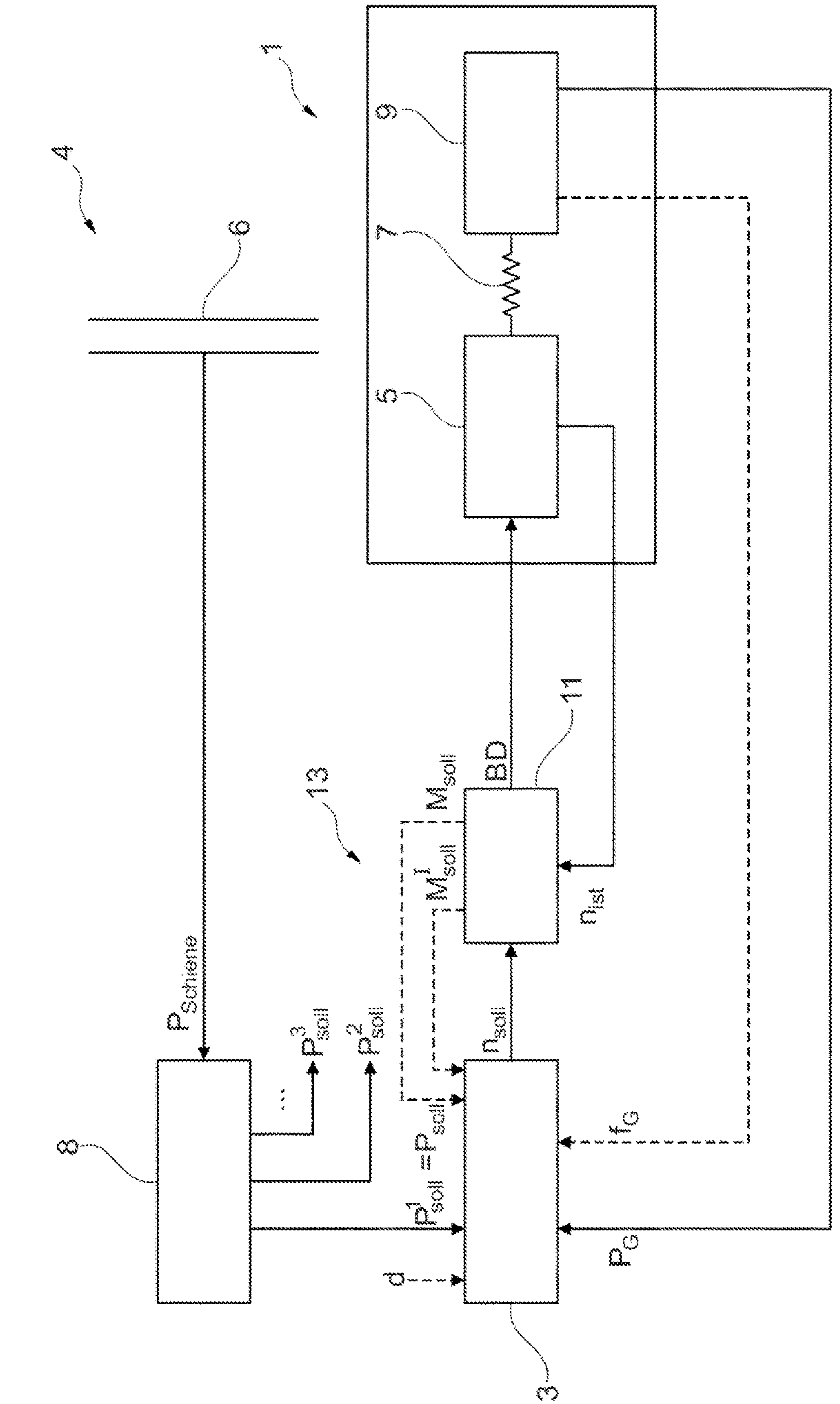
FIG. 1 shows a first schematic representation of an exemplary embodiment of a power assembly with an exemplary embodiment of a control device.

FIG. 1 shows a first schematic representation of an exemplary embodiment of a power assembly 1 with a first exemplary embodiment of a closed-loop control device 3. The power assembly 1 is part of a higher-level network of a multiplicity of power assemblies, of which only the one power assembly 1 considered in greater detail here is shown. In particular, the power assembly 1 is electrically connected to a power grid 4, here specifically to a busbar 6. In particular, the power assembly 1 can be operated in island parallel operation or in mains parallel operation; in particular, the power grid 4 can be a local power grid, in particular an on-board electrical system of a vehicle, for example a ship, or a supra-regional power grid. An external open-loop control unit 8 is assigned to the power grid 4 and distributes a total power $P_{Schiene}$ requested at the busbar 6, which is also referred to as the total load, across the individual power assemblies 1, in particular by setting a separate target generator power $P_{soll}^1$, $P_{soll}^2$, $P_{soll}^3$, etc. for each power assembly 1. A first target generator power $P_{soll}^1$ assigned to the power assembly 1 specifically shown here is referred to in the following as the target generator power $P_{soll}$ for short for the sake of simplicity.

The power assembly 1 has an internal combustion engine 5 and a generator 9 which has an operative drive connection to the internal combustion engine 5 via a shaft 7 shown schematically. The closed-loop control device 3 is operatively connected to the internal combustion engine 5 on the one hand and to the generator 9 on the other. In particular, the generator 9 is electrically connected to the busbar 6 in a manner not presented explicitly here.

In particular, the closed-loop control device 3 is set up for closed-loop control of the power assembly 1, wherein it is set up to detect a generator power $P_G$ of the generator 9 as a controlled variable, to determine a control deviation as the difference between the detected generator power $P_G$ and the target generator power $P_{soll}$, and to determine a target speed $n_{soll}$ as a manipulated variable for controlling the internal combustion engine 5 as a function of the control deviation. The closed-loop control device 3 is also designed to use a control rule for determining the target speed $n_{soll}$. The closed-loop control device 3 is designed as a generator controller and is operatively connected to an open-loop control device 11 of the internal combustion engine 5 in such a way that the target speed $n_{soll}$ can be transmitted by the closed-loop control device 3 to the open-loop control device 11. This also enables, at the same time, particularly robust power control and versatile use of the closed-loop control device 3, in particular with a multiplicity of power assemblies 1.

The closed-loop control device 3 is optionally set up to adapt the control rule used to determine the target speed $n_{soll}$ as a function of at least one adaptation variable, wherein the at least one adaptation variable is selected from a group consisting of the detected generator power $P_G$, a generator frequency $f_G$, a droop variable d and a target torque variable—calculated in particular by the open-loop control device of the internal combustion engine.

The closed-loop control device 3 and the open-loop control device 11 together form a closed-loop control arrangement 13 for closed-loop control of the power assembly 1. The open-loop control device 11 is optionally designed as an engine controller, in particular as an engine control unit (ECU).

In particular, the open-loop control device 11 is set up to calculate the at least one target torque variable and to transmit it to the closed-loop control device 3, wherein the closed-loop control device 3 is set up to receive the at least one target torque variable from the open-loop control device 11.

Figure 2:
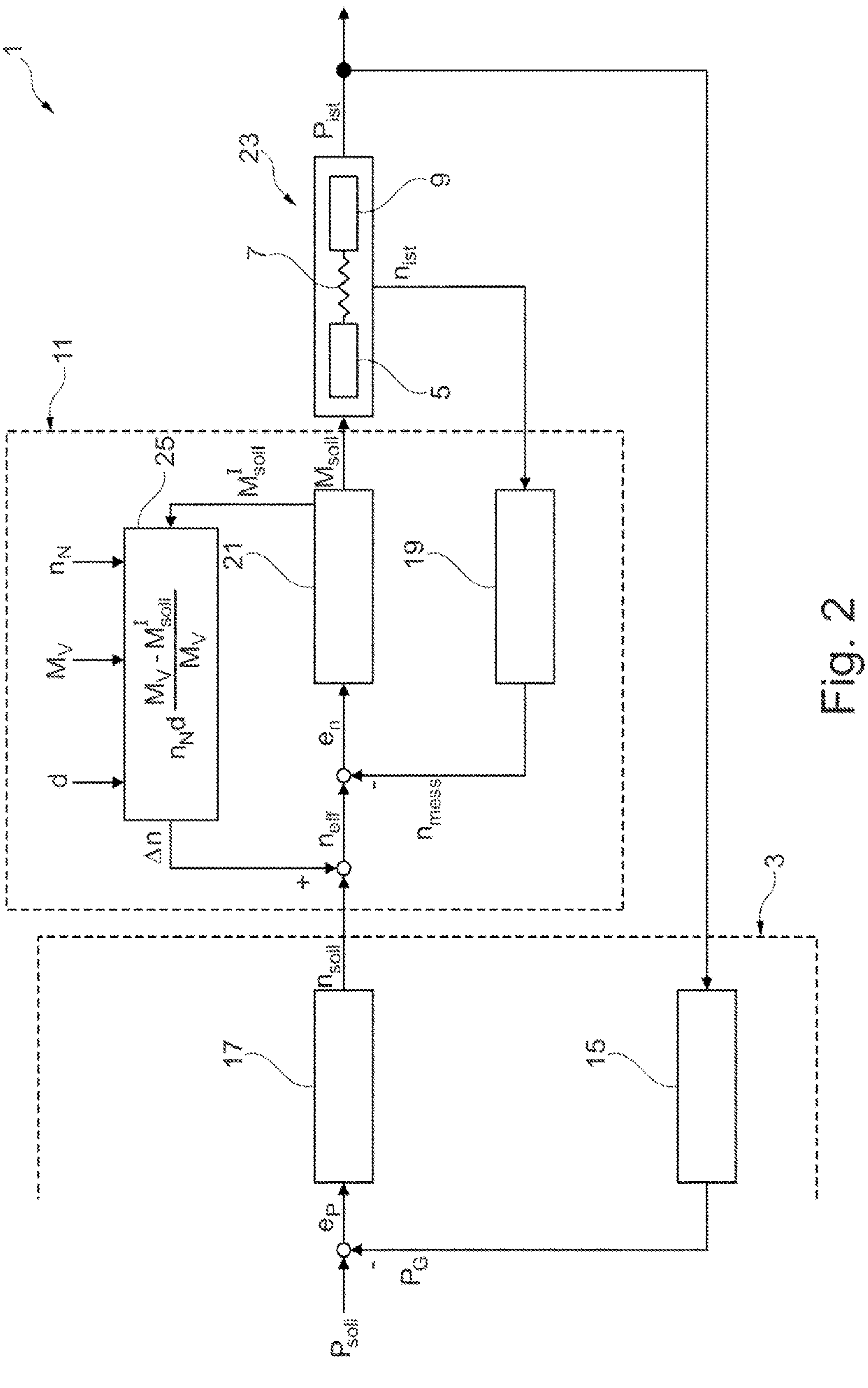
FIG. 2 shows a second schematic representation of the exemplary embodiment of the power assembly according to FIG. 1.

In addition, the open-loop control device 11 is optionally set up to determine a variable as the target torque variable which is selected from a group consisting of a—optionally filtered—target torque $M_{soll}$ and an integral component of a speed controller 21—shown in FIG. 2—of the closed-loop control device 11, in particular an integral component $M_{soll}^{I}$ of the target torque $M_{soll}$.

Optionally, another input variable of the closed-loop control device 3 is the droop variable d.

The open-loop control device 11 also has the target speed $n_{soll}$ and a detected speed $n_{ist}$ as input variables. From this, the open-loop control device 11 calculates a speed control deviation. Lastly, the open-loop control device 11 uses this speed control deviation to calculate an energization duration BD for controlling the fuel injection valves of the internal combustion engine 5. Optionally, the open-loop control device 11 first calculates the target torque $M_{soll}$ from the speed control deviation and, from this, in turn, the energization duration BD.

FIG. 2 shows a second schematic representation of the exemplary embodiment of the power assembly 1 according to FIG. 1, in particular in the form of a block diagram.

Like and functionally similar elements are provided with the same reference signs in all figures, and therefore reference is made to the previous description in each case.

Optionally, an actual power $P_{ist}$ detected at the generator 9 is filtered in a power filter 15, and the filtered actual power $P_{ist}$ is used as the detected generator power $P_G$. The power filter 15 is optionally a $PT_1$ filter or a mean value filter. The power filter 15 is optionally part of the closed-loop control device 3, which also has a power controller 17 that calculates the target speed $n_{soll}$ from the control deviation $e_P$ as the difference between the target generator power $P_{soll}$ and the detected generator power $P_G$.

The open-loop control device 11 has a speed filter 19, which is optionally designed as a $PT_1$ filter or mean value filter. A measured speed $n_{mess}$, optionally used to calculate a speed control deviation $e_n$, is obtained by filtering the actual speed $n_{ist}$ measured directly at the internal combustion engine 5 using the speed filter 19. The open-loop control device 11 also has the speed controller 21, which calculates the target torque $M_{soll}$ from the speed control deviation $e_n$ and optionally, from this, —in a manner not shown—the energization duration BD. A controlled system 23 of the speed control loop assigned to the speed controller 21 includes the internal combustion engine 5, the shaft 7 and the generator 9.

In the text which follows, the meaning of the droop variable d will be explained in more detail:

The droop variable d is optionally used to calculate a differential speed Δn, wherein an effective target speed $n_{eff}$ is calculated by adding the differential speed Δn to the target speed $n_{soll}$. The effective target speed $n_{eff}$ is used to calculate the speed control deviation $e_n$ by subtracting the measured speed $n_{mess}$ from the effective target speed $n_{eff}$. The differential speed Δn is calculated in a calculation block 25. The input variables of the calculation block 25 are the integral component $M_{soll}^{I}$, calculated by the speed controller 21, of the target torque $M_{soll}$, the droop variable d, a full-load torque $M_V$, and a nominal speed $n_N$ for the internal combustion engine 5, wherein the nominal speed $n_N$ can be 1500 $min^{-1}$, for example. The differential speed Δn is optionally calculated according to the following equation:

$$\Delta n = n_N d \frac{M_V - M_{soll}^{I}}{M_V}. \tag{24}$$

The droop variable d is optionally set to a finite value, in particular in the single-digit percentage range, optionally to a maximum of 8%, optionally to 4%. The droop variable d can be preset, i.e., in particular parameterized, by a user of the power assembly 1 or the closed-loop control device 3. The droop variable d can also be set to zero, in this case both in the closed-loop control device 3 and in the open-loop control device 11. If the droop variable d is zero, the differential speed Δn also vanishes, so that the effective target speed $n_{eff}$ is then equal to the target speed $n_{soll}$.

If the droop variable d is different from zero, the result is as follows: If the internal combustion engine 5 is running at full load, the integral component $M_{soll}^{I}$ of the target torque $M_{soll}$ is equal to the full-load torque $M_V$, so that the differential speed Δn is zero. If, on the other hand, the internal combustion engine 5 is idling, the integral component $M_{soll}^{I}$ is zero and the differential speed Δn is equal to the percentage of the nominal speed $n_N$ determined by the droop variable d. If the nominal speed $n_N$ is 1500 $min^{-1}$ and the droop variable d is 4%, the value of the differential speed Δn therefore varies between 0 $min^{-1}$ at full load and 60 $min^{-1}$ at idling speed.

Figure 3:
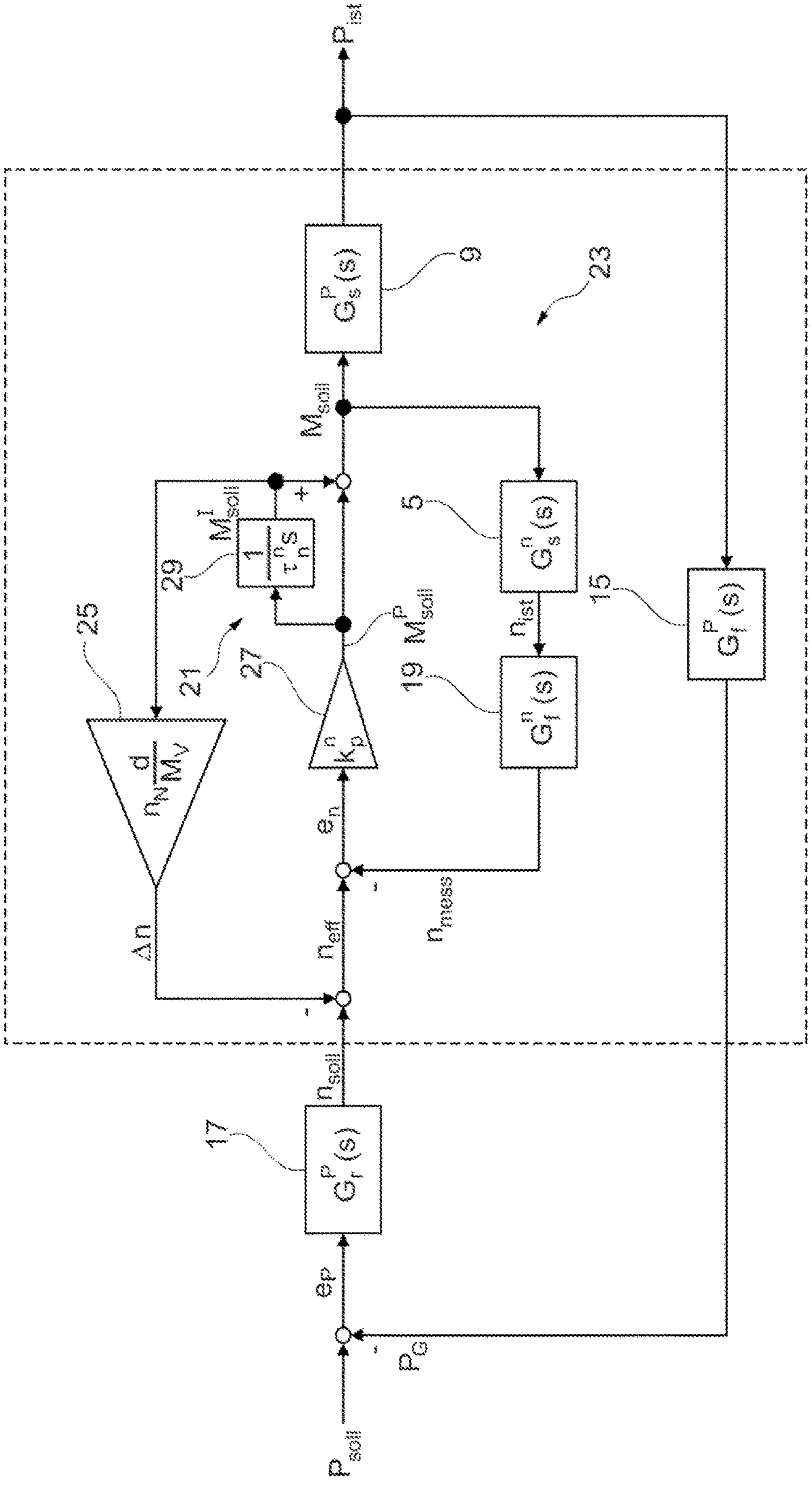
FIG. 3 shows a third schematic representation of the exemplary embodiment of the power assembly according to FIG. 1.

FIG. 3 shows a third schematic representation of the power assembly 1 according to FIG. 1, in this case as a linearized block diagram. The individual controllers are represented by transfer blocks with correspondingly assigned transfer functions. In contrast to FIG. 2, the controlled system 23 in FIG. 3 is shown divided into two transfer blocks, namely a transfer block assigned to the internal combustion engine 5, characterized by the transfer function $G_s^{n}(s)$, with the target torque $M_{soll}$ as the input variable and the actual speed $n_{ist}$ as the output variable, and a transfer block assigned to the generator 9, characterized by the transfer function $G_s^{P}(s)$, with the same input variable, namely the target torque $M_{soll}$, and the actual power $P_{ist}$ as output variable. The speed controller 21 is represented by a first multiplication element 27 for calculating a proportional component $M_{soll}^{P}$ of the target torque $M_{soll}$ by multiplication with the speed proportional coefficient $k_p^{n}$ and a first integration element 29 for calculating the integral component $M_{soll}^{I}$ of the target torque $M_{soll}$ by multiplication with a term $$\frac{1}{\tau_n^{n} s},$$

with the reset time $\tau_n^{n}$ in and the complex variable s. Thus, the speed controller 21 has a PI transmission behavior here, since the first multiplication element 27 has a proportional transmission behavior and the first integration element 29 has an integral transmission behavior. The calculation block 25 is given a negative sign by the linearization here, so that the differential speed Δn calculated in the calculation block 25 is now subtracted from the target speed $n_{soll}$. Due to the linearization, the differential speed Δn is calculated in the calculation block 25 according to the following modified equation:

$$\Delta n = n_N d \frac{M_{soll}^{I}}{M_V}. \tag{25}$$

Figure 4:
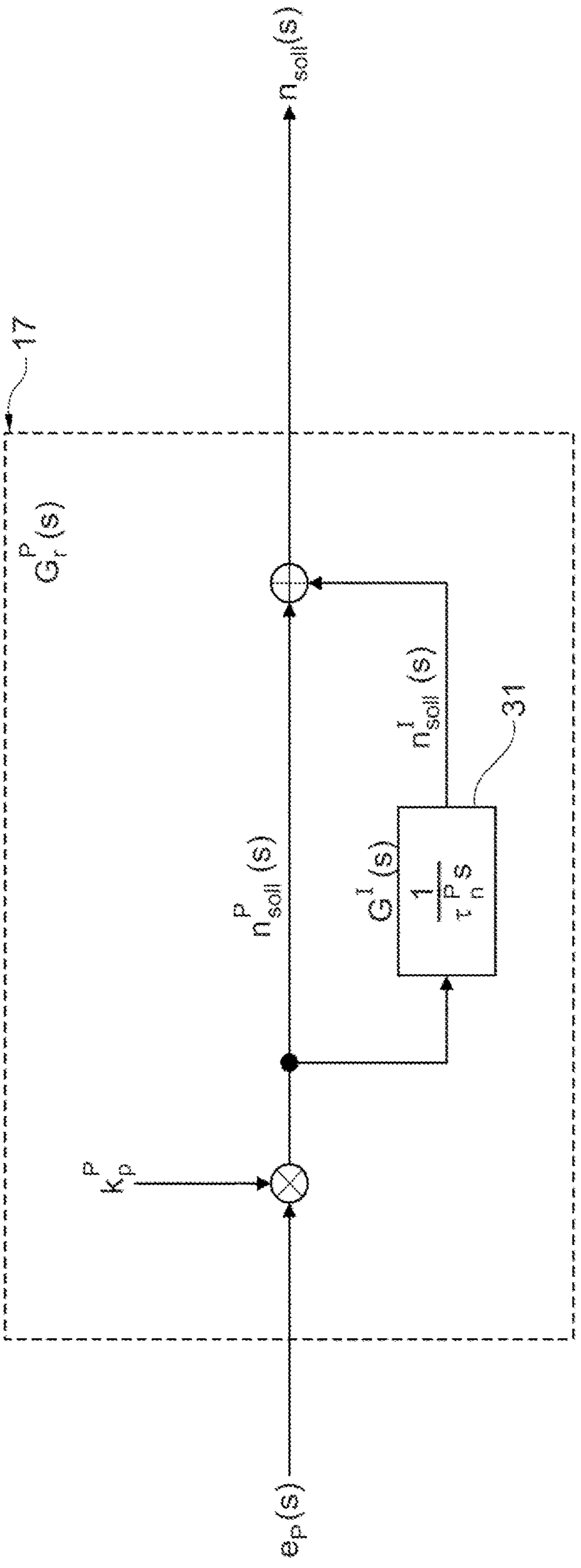
FIG. 4 shows a detailed representation of a power controller.

FIG. 4 shows a schematic representation of a power controller 17 according to FIG. 3, which is optionally implemented as a PI controller. The control deviation $e_P$ is first multiplied by the proportional coefficient $k_p^{P}$ so that a proportional component $k_p^{P}$ for the target speed $n_{soll}$ is obtained. In a second integration element 31, the proportional component $n_{soll}^P$, by division by the product of the reset time $\tau_n^P$ with the complex variable s, calculates an integral component $n_{soll}^I$ for the target speed $n_{soll}$, which is then added to the proportional component $n_{soll}^P$. This results in the target speed $n_{soll}$ as output variable. The transfer function of the power controller 17 is therefore given by:

$$G_r^P(s) = k_p^P\left(1 + \frac{1}{\tau_n^P s}\right). \quad (26)$$

The calculation of the proportional coefficient $k_p^P$ is optionally calculated according to equation (1).

The control rule is adapted here in particular by determining the proportional coefficient $k_p^P$ in such a way that the predetermined loop gain $v^P$ is constant, in particular remains constant.

Figure 5:
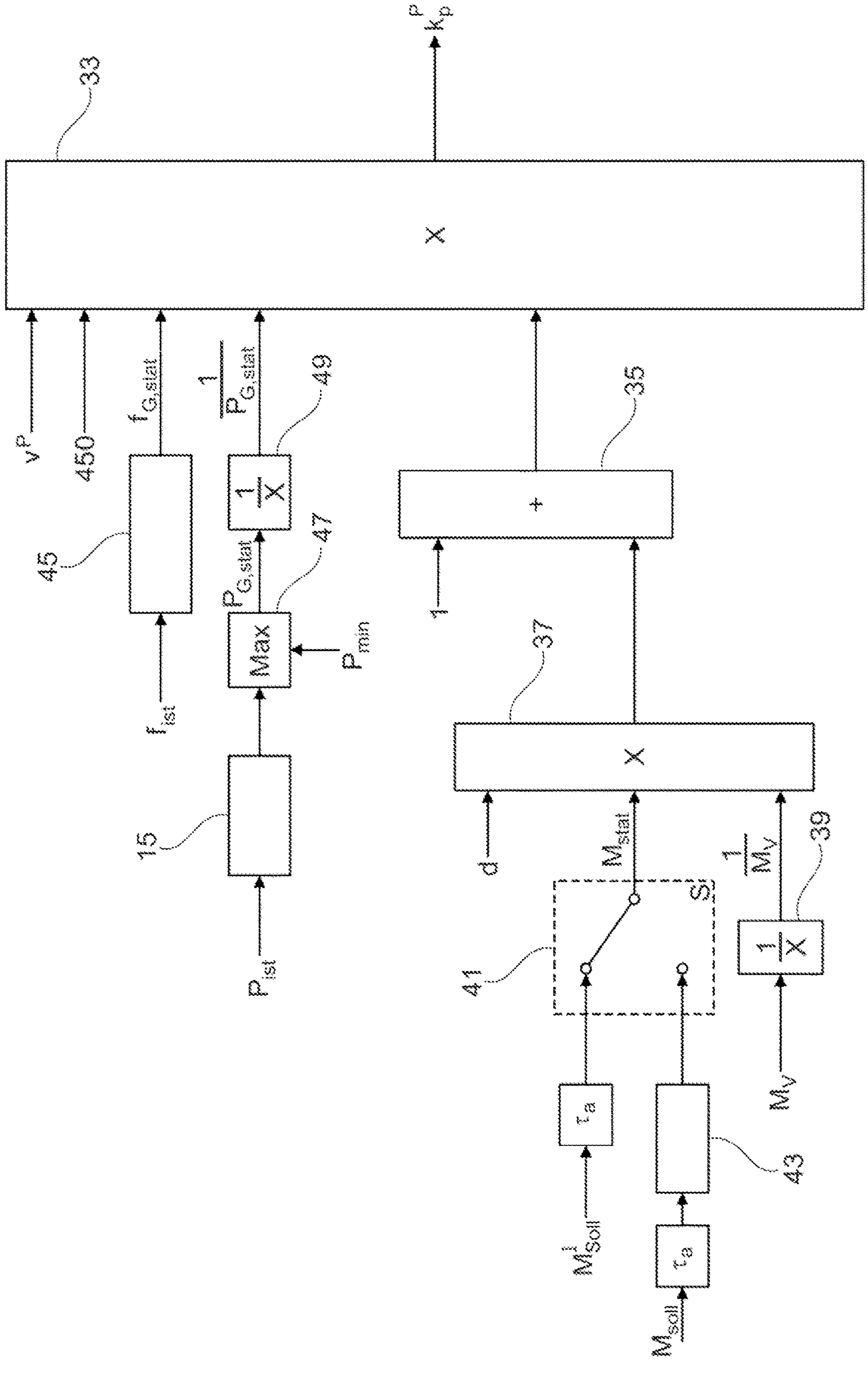
FIG. 5 shows a detailed representation of a first embodiment of a method for calculating the proportional coefficient for the power control.

FIG. 5 shows a detailed representation of a first embodiment of a method for calculating the proportional coefficient $k_p^P$ for the power control according to equation (1). For this purpose, the predetermined loop gain $v^P$ is multiplied in a second multiplication element 33 by the factor 450, the generator frequency $f_{G,stat}$, the reciprocal of the generator power $P_{G,stat}$, and an output of a summation element 35. The proportional coefficient $k_p^P$ is obtained as the output of the second multiplication element 33. In the summation element 35, the number 1 is added to the output of a third multiplication element 37. In the third multiplication element 37, the droop variable d is multiplied by the torque $M_{stat}$ and the reciprocal value of the full-load torque $M_V$. The reciprocal value of the full-load torque $M_V$ is formed from the full-load torque $M_V$ in a first reciprocal value element 39.

The torque $M_{stat}$ can be determined in two different ways: On the one hand, from the integral component $M_{soll}^I$ delayed by a sampling step $\tau_a$. In this case, a switch 41 provided for switching between the two calculation types is arranged in the upper switch position according to FIG. 5.

Alternatively, the torque $M_{stat}$ can be calculated from the target torque $M_{soll}$ calculated by the open-loop control device 11. This is also first delayed by a sampling step $\tau_a$ and then filtered by a torque filter 43, wherein the torque filter 43 is optionally a $PT_1$ filter or a mean value filter. This calculation is active when the switch 41 is in the lower switch position according to FIG. 5.

The generator frequency $f_{G,stat}$ is optionally calculated by filtering an actual frequency $f_{ist}$, which is optionally detected at the generator 9, using a frequency filter 45. The frequency filter 45 is not explicitly shown in FIG. 1 for reasons of simplification.

The generator power $P_{G,stat}$ is optionally calculated by first filtering the actual power $P_{ist}$ using the power filter 15 and then limiting it downward to a predetermined power limit value $P_{min}$ in a limiting element 47. The reciprocal value of the generator power $P_{G,stat}$ limited in this way is then calculated in a second reciprocal value element 49. The reciprocal value calculated in this way is then fed to the second multiplication element 33. Both the power filter 15 and the limiting element 47 are not explicitly shown in FIG. 1 for reasons of simplification.

Figure 6:
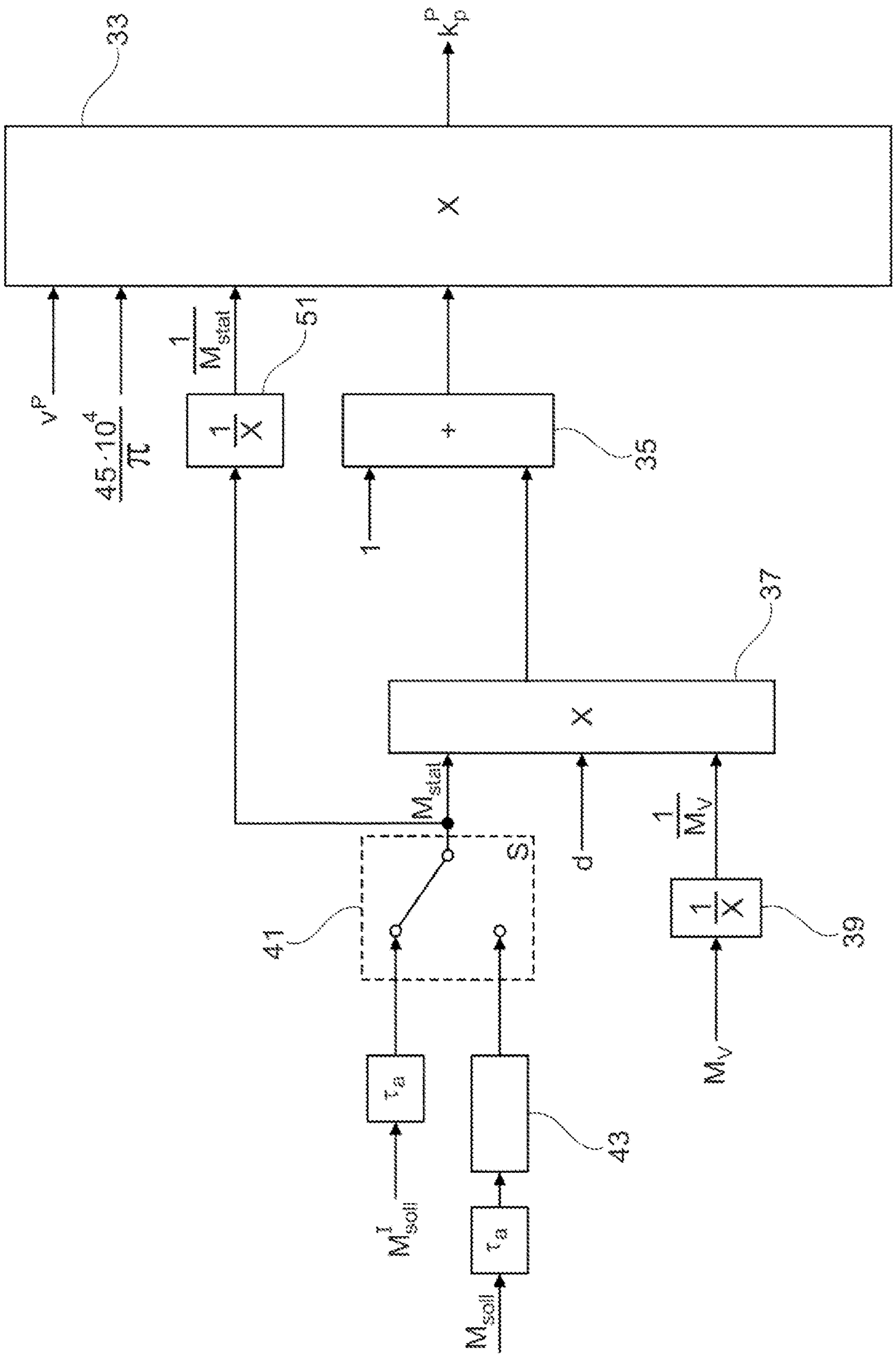
FIG. 6 shows a detailed representation of a second embodiment of a method for calculating the proportional coefficient for the power control.

FIG. 6 shows a detailed representation of a second embodiment of a method for calculating the proportional coefficient $k_p^P$ for power control according to equation (21). In the second multiplication element 33, the predetermined loop gain $v^P$ is multiplied here by the factor $45 \cdot 10^4/\pi$, the reciprocal of the torque $M_{stat}$, and the output of the summation element 35. The proportional coefficient $k_p^P$ is again obtained as the output of the second multiplication element 33. The torque $M_{stat}$ is branched off from the calculation for the third multiplication element 37, and its reciprocal value is formed in a third reciprocal value element 51. Otherwise, the calculation is carried out as described in conjunction with FIG. 5.

Figure 7:
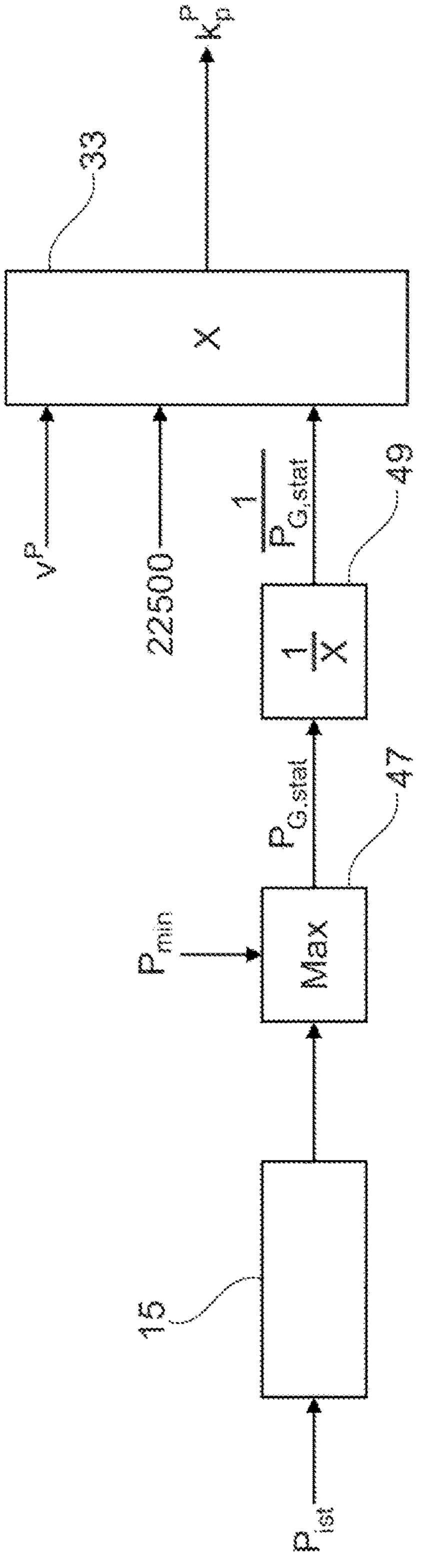
FIG. 7 shows a detailed representation of a third embodiment of a method for calculating the proportional coefficient for the power control.

FIG. 7 shows a detailed representation of a third embodiment of a method for calculating the proportional coefficient $k_p^P$ for power control according to equation (19) and thus for a constant generator frequency with a standard frequency value of 50 Hz. In the second multiplication element 33, the predetermined loop gain $v^P$ is multiplied by the factor 22500 and the reciprocal of the generator power $P_{G,stat}$. The proportional coefficient $k_p^P$ is again obtained as the output of the second multiplication element 33. The reciprocal value of the generator power $P_{G,stat}$ is calculated here as described in conjunction with FIG. 5.

Figure 8:
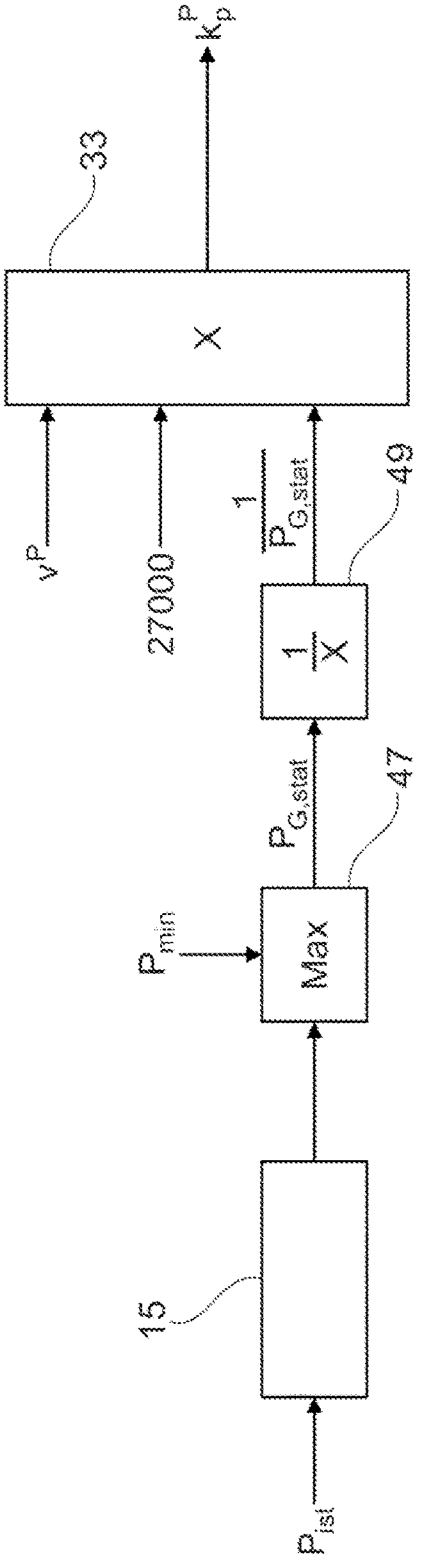
FIG. 8 shows a detailed representation of a fourth embodiment of a method for calculating the proportional coefficient for the power control.

FIG. 8 shows a detailed representation of a fourth embodiment of a method for calculating the proportional coefficient $k_p^P$ for power control according to equation (20) and thus for a constant generator frequency with a standard frequency value of 60 Hz. In the second multiplication element 33, the predetermined loop gain $v^P$ is multiplied by the factor 27000 and the reciprocal of the generator power $P_{G,stat}$. The proportional coefficient $k_p^P$ is again obtained as the output of the second multiplication element 33. The reciprocal value of the generator power $P_{G,stat}$ is calculated here as described in conjunction with FIG. 5.

Alternatively, the proportional coefficient $k_p^P$ can also optionally be calculated in particular according to one of equations (2), (3), (17) or (18).

Figure 9:
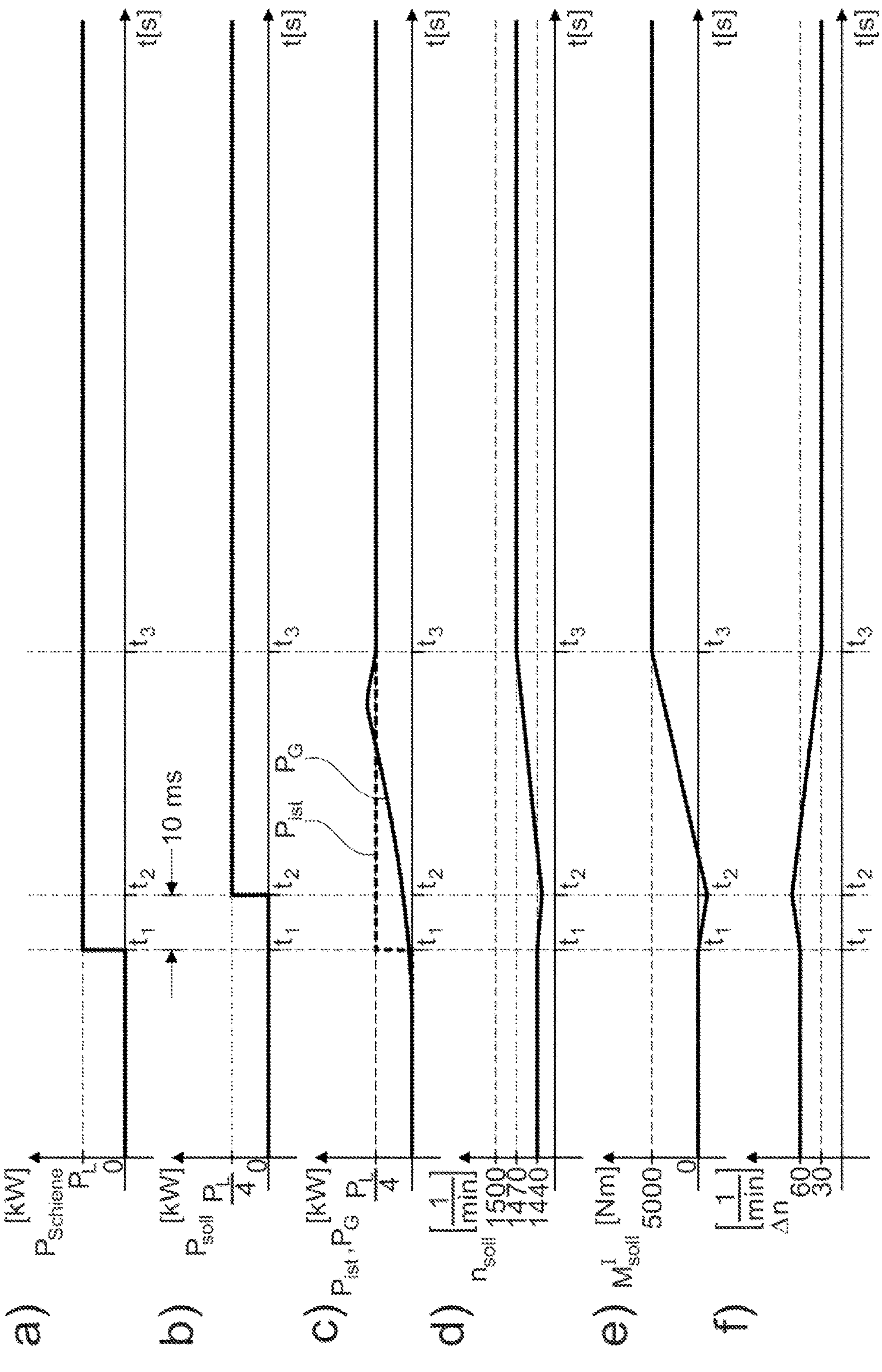
FIG. 9 shows a schematic, diagrammatic representation of the mode of operation of an embodiment of a method for closed-loop control of a power assembly.

FIG. 9 shows a schematic, diagrammatic representation of the method. A first time graph at a) shows the total power $P_{Schiene}$ measured on the busbar 6. This is identical to the value 0 kW up to a first point in time $t_1$. At the first point in time $t_1$, the total power $P_{Schiene}$ changes abruptly to a specific value $P_L$ and subsequently remains at this value.

A second time graph at b) shows the target generator power $P_{soll}$, which is transmitted to the closed-loop control device 3 by the external open-loop control unit 8. Since the target generator power $P_{soll}$ is calculated in the external open-loop control unit 8, there is a time delay until the target generator power $P_{soll}$ is available in the closed-loop control device 3. For clarification and concretization, it is assumed here that there is island parallel operation of four identical power assemblies 1, wherein the total power $P_{Schiene}$ is to be distributed evenly across all four power assemblies 1. For this reason, the target generator power $P_{soll}$ rises abruptly to a value $P_L/4$ at a second point in time $t_2$ and subsequently remains identical to this value. The time delay between the first point in time $t_1$ and the second point in time $t_2$ is optionally two sampling steps, i.e., with a sampling time of 5 ms, the total time span is 10 ms.

A third time graph at c) shows two curves: a first, dashed curve shows the instantaneous actual power $P_{ist}$ generated by the individual generator 9 of the individual power assembly 1. Since the total power $P_{Schiene}$ must be provided in equal parts by the generators 9 of the four power assemblies 1, the actual power $P_{ist}$—also at the first point in time $t_1$—rises abruptly to the value $P_L/4$. A second, solid curve shows the detected generator power $P_G$, which is obtained by filtering from the actual power $P_{ist}$. As the detected generator power $P_G$ is the output variable of a filter, it increases with a time delay—starting from the first point in time $t_1$—and settles at the value $P_L/4$ at a third point in time $t_3$.

A fourth time graph at d) shows a time curve of the target speed $n_{soll}$. A fifth time graph at e) shows a time curve of the integral component $M_{soll}^{I}$ for the target torque $M_{soll}$. A sixth time graph at f) shows the time curve of the differential speed Δn. The load application shown in the first time graph is an example—as shown in the second graph—of an application of a 50% load—based on full load—and optionally corresponds to a torque of 5000 Nm. The droop variable d is set to a value of 4% in the exemplary embodiment considered here.

Up to the first time $t_1$, the internal combustion engine 5 is in a load-free state, resulting in a value of 60 $min^{-1}$ for the differential speed Δn—as shown in the sixth time graph. Since a sum of the target speed $n_{soll}$ and the differential speed Δn at a target frequency for the generator 9 of 50 Hz must result in an effective target speed $n_{eff}$ of 1500 $min^{-1}$—the value of the nominal speed $n_{eff}$—the target speed $n_{soll}$ up to the first point in time $t_1$ is 1440 $min^{-1}$. The integral component $M_{soll}^{I}$ up to the first point in time $t_1$ is 0 Nm.

From the first point in time $t_1$ to the second time $t_2$, there is a negative control deviation $e_P$, as the detected generator power $P_G$ assumes larger values than the target generator power $P_{soll}$. This results in a decreasing target speed $n_{soll}$ as a manipulated variable for the power control loop. If the target speed $n_{soll}$ falls, the effective target speed $n_{eff}$, which is not explicitly shown here, also falls at the same time. This results in a negative speed control deviation $e_n$, whereby the integral component $M_{soll}^{I}$ of the speed controller 21 becomes smaller. The decreasing integral component $M_{soll}^{I}$ leads to an increase in the differential speed Δn as shown in FIG. 2. This ensures that the effective target speed $n_{eff}$ returns to the nominal speed $n_N$.

At the second point in time $t_2$, the target generator power $P_{soll}$ is increased to the value $P_L/4$. This now results in a positive control deviation $e_P$. As a result, the target speed $n_{soll}$ is increased. As the effective target speed $n_{eff}$ is also increased with the target speed $n_{soll}$, this results in a positive speed control deviation $e_n$, so that the integral component $M_{soll}^{I}$ of the speed controller 21 is increased. As a result, the differential speed Δn is reduced. As the target generator power $P_{soll}$ is increased to 50% of the maximum power, the differential speed Δn drops to the value 30 $min^{-1}$ at a value of the droop variable d of 4%. This value is reached at the third point in time $t_3$. As the effective target speed $n_{eff}$ is identical to the nominal speed $n_N$ in the steady state, the target speed $n_{soll}$ increases by 30 $min^{-1}$ to the value 1470 $min^{-1}$ by the third time $t_3$. The integral component $M_{soll}^{I}$ reaches 50% of the maximum torque at the third time $t_3$ with the value 5000 Nm. From the third time $t_3$ the system is in a steady state.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A closed-loop control device for closed-loop control of a power assembly including an internal combustion engine and a generator having an operative drive connection to the internal combustion engine, the closed-loop control device comprising:

the closed-loop control device which is configured for:

detecting a generator power ($P_G$) of the generator as a controlled variable;

determining a control deviation ($e_P$) as a difference between the generator power ($P_G$) which is detected and a target generator power ($P_{soll}$);

determining a target speed ($n_{soll}$) as a manipulated variable for controlling the internal combustion engine as a function of the control deviation ($e_P$);

using a control rule for determining the target speed ($n_{soll}$); and being operatively connected to an open-loop control device of the internal combustion engine in such a way that the target speed ($n_{soll}$) can be transmitted by the closed-loop control device to the open-loop control device.

2. The closed-loop control device according to claim 1, wherein the closed-loop control device is configured for adapting the control rule used to determine the target speed ($n_{soll}$) as a function of at least one adaptation variable, and wherein the at least one adaptation variable is selected from a group consisting of: the generator power ($P_G$) that is detected; a generator frequency ($f_G$); a droop variable (d); and at least one target torque variable.

3. The closed-loop control device according to claim 2, wherein the at least one target torque variable is calculated by the open-loop control device of the internal combustion engine.

4. The closed-loop control device according to claim 2, wherein the closed-loop control device is configured for adapting the control rule by determining a proportional coefficient ($k_p^P$) of the control rule in such a way that a predetermined loop gain ($v^P$) of an open control loop is constant.

5. The closed-loop control device according to claim 4, wherein the closed-loop control device is configured for calculating the proportional coefficient ($k_p^P$) as a function of the generator power ($P_G$), the generator frequency ($f_G$), the droop variable (d), and the at least one target torque variable.

6. The closed-loop control device according to claim 4, wherein the closed-loop control device is configured for calculating the proportional coefficient ($k_p^P$) as a function of:

(a) the generator power ($P_G$), the droop variable (d), and the at least one target torque variable;

(b) the generator power ($P_G$) and the generator frequency ($f_G$);

(c) only the generator power ($P_G$); or (d) the droop variable (d) and the at least one target torque variable.

7. The closed-loop control device according to claim 4, wherein the closed-loop control device is configured for calculating the proportional coefficient ($k_p^P$) as a function of:

(a) the generator power ($P_G$), the droop variable (d), and the at least one target torque variable, wherein the generator frequency ($f_G$) is set so as to be constant;

(b) the generator power ($P_G$) and the generator frequency ($f_G$);

(c) only the generator power ($P_G$), wherein the generator frequency ($f_G$) is set so as to be constant; or (d) the droop variable (d) and the at least one target torque variable.

8. The closed-loop control device according to claim 1, wherein the closed-loop control device is configured for filtering an actual power ($P_{ist}$)—which is instantaneous—of the generator and for using the actual power ($P_{ist}$)—which is filtered—as the generator power ($P_G$) that is detected.

9. A closed-loop control arrangement for closed-loop control of a power assembly including an internal combustion engine and a generator having an operative drive connection to the internal combustion engine, the closed-loop control arrangement comprising:

a closed-loop control device for closed-loop control of the power assembly, the closed-loop control device being configured for:

detecting a generator power ($P_G$) of the generator as a controlled variable;

determining a control deviation ($e_P$) as a difference between the generator power ($P_G$) which is detected and a target generator power ($P_{soll}$);

determining a target speed ($n_{soll}$) as a manipulated variable for controlling the internal combustion engine as a function of the control deviation ($e_P$);

using a control rule for determining the target speed ($n_{soll}$); and being operatively connected to an open-loop control device of the internal combustion engine; and the open-loop control device which is operatively connected to the closed-loop control device for direct control of the internal combustion engine, the closed-loop control device being configured for transmitting the target speed ($n_{soll}$) to the open-loop control device.

10. The closed-loop control arrangement according to claim 9, wherein the open-loop control device is configured for determining at least one target torque variable and for transmitting the at least one target torque variable to the closed-loop control device, and wherein the closed-loop control device is configured for receiving the at least one target torque variable from the open-loop control device.

11. The closed-loop control arrangement according to claim 10, wherein the open-loop control device is configured for determining, as the at least one target torque variable, a variable which is selected from a group consisting of: a target torque ($M_{soll}$) and an integral component ($M_{soll}^I$) of a speed controller of the open-loop control device.

12. The closed-loop control arrangement according to claim 11, wherein the target torque ($M_{soll}$) is filtered.

13. A power assembly, comprising:

an internal combustion engine;

a generator including an operative drive connection to the internal combustion engine; and one of:

(a) a closed-loop control device for closed-loop control of the power assembly, the closed-loop control device being configured for:

detecting a generator power ($P_G$) of the generator as a controlled variable;

determining a control deviation ($e_P$) as a difference between the generator power ($P_G$) which is detected and a target generator power ($P_{soll}$);

determining a target speed ($n_{soll}$) as a manipulated variable for controlling the internal combustion engine as a function of the control deviation ($e_P$);

using a control rule for determining the target speed ($n_{soll}$); and being operatively connected to an open-loop control device of the internal combustion engine in such a way that the target speed ($n_{soll}$) can be transmitted by the closed-loop control device to the open-loop control device; and (b) a closed-loop control arrangement for closed-loop control of the power assembly, the closed-loop control arrangement including:

a closed-loop control device for closed-loop control of the power assembly, the closed-loop control device being configured for:

detecting a generator power ($P_G$) of the generator as a controlled variable;

determining a control deviation ($e_P$) as a difference between the generator power ($P_G$) which is detected and a target generator power ($P_{soll}$);

determining a target speed ($n_{soll}$) as a manipulated variable for controlling the internal combustion engine as a function of the control deviation ($e_P$);

using a control rule for determining the target speed ($n_{soll}$); and being operatively connected to an open-loop control device of the internal combustion engine; and the open-loop control device which is operatively connected to the closed-loop control device for direct control of the internal combustion engine, the closed-loop control device being configured for transmitting the target speed ($n_{soll}$) to the open-loop control device;

wherein the closed-loop control device or the closed-loop control arrangement is operatively connected to the internal combustion engine and the generator of the power assembly.

14. A method for closed-loop control of a power assembly including an internal combustion engine and a generator having an operative drive connection to the internal combustion engine, the method comprising the steps of:

detecting a generator power ($P_G$) of the generator as a controlled variable;

determining a control deviation ($e_P$) as a difference between the generator power ($P_G$) which is detected and a target generator power ($P_{soll}$);

determining a target speed ($n_{soll}$) as a manipulated variable for controlling the internal combustion engine as a function of the control deviation ($e_P$); and determining the target speed ($n_{soll}$) based on a control rule.

15. The method according to claim 14, wherein the step of determining the target speed ($n_{soll}$) based on the control rule includes calculating the target speed ($n_{soll}$) based on the control rule.

* * * * *